United States Patent
Liu et al.

(10) Patent No.: US 8,548,154 B2
(45) Date of Patent: Oct. 1, 2013

(54) METHOD AND SYSTEM OF RINGTONE UPLOADING SERVICE

(75) Inventors: Meixia Liu, Shenzhen (CN); Xiaopeng Wei, Guangdong (CN)

(73) Assignee: ZTE Corporation, Shenzhen, Guangdong (CN)

( * ) Notice: Subject to any disclaimer, the term of this patent is extended or adjusted under 35 U.S.C. 154(b) by 48 days.

(21) Appl. No.: 13/119,879

(22) PCT Filed: Sep. 14, 2009

(86) PCT No.: PCT/CN2009/073904
§ 371 (c)(1), (2), (4) Date: Mar. 18, 2011

(87) PCT Pub. No.: WO2010/069187
PCT Pub. Date: Jun. 24, 2010

(65) Prior Publication Data
US 2011/0235795 A1    Sep. 29, 2011

(30) Foreign Application Priority Data

Dec. 17, 2008    (CN) .......................... 2008 1 0241276

(51) Int. Cl.
*H04M 3/42*    (2006.01)
*H04B 1/38*    (2006.01)

(52) U.S. Cl.
USPC ... 379/257; 379/87; 379/201.02; 379/373.03; 455/414.1; 455/567

(58) Field of Classification Search
USPC .................. 379/201.01, 201.02, 201.05, 257, 379/87, 373.03, 373.04; 455/414.1, 567
See application file for complete search history.

(56) References Cited

U.S. PATENT DOCUMENTS

| | | | |
|---|---|---|---|
| 7,813,490 B2 * | 10/2010 | DeMent et al. | 379/221.03 |
| 7,940,909 B2 * | 5/2011 | Yan | 379/201.05 |
| 2006/0109970 A1 | 5/2006 | Shim et al. | |
| 2008/0293390 A1 * | 11/2008 | Yang et al. | 455/414.1 |

FOREIGN PATENT DOCUMENTS

| | | |
|---|---|---|
| CN | 1997052 A | 7/2007 |
| CN | 101076057 A | 11/2007 |
| CN | 101110997 A | 1/2008 |
| CN | 101150758 A | 3/2008 |

OTHER PUBLICATIONS

Form PCT/ISA/210, International Search Report for PCT/CN2009/073904 (dated Dec. 24, 2009).
English Translation of the Written Opinion of the International Search Authority in international application No. PCT/CN2009/073904, mailed on Dec. 24, 2009.

* cited by examiner

*Primary Examiner* — Harry Hong
(74) *Attorney, Agent, or Firm* — Edwards Wildman Palmer LLP; Howard M. Glitten

(57) ABSTRACT

The present invention discloses a ringtone uploading service method and system used in color ring back tone (CRBT) service. The present invention is that when a ringtone system successfully uploads a ringtone to at least one but not all ringtone servers, it records ringtone uploading information, sends a message about the successful uploading of the ringtone to an uploading terminal, and re-uploads the ringtone to the ringtone servers to which the ringtone has not been successfully uploaded. The ringtone uploading solution proposed in the present invention will greatly improve the success rate of ringtone uploading.

12 Claims, 4 Drawing Sheets

METHOD AND SYSTEM OF RINGTONE UPLOADING SERVICE

CROSS REFERENCES TO RELATED APPLICATIONS

This application is a U.S. national phase application pursuant to 35 U.S.C. §371, of PCT/CN2009/073904 filed on Sep. 14, 2009, which claims priority to Chinese Patent Application No. 200810241276.3 filed on Dec. 17, 2008. The entire contents of the aforementioned patent applications are incorporated herein by these references.

TECHNICAL FIELD

The present invention relates to color ring back tone (CRBT) services, particularly to a method and system of ringtone uploading service.

BACKGROUND

As a mature value-added service, the CRBT service has a wide range of user-groups and brings huge profits to operators. With the development of the CRBT service, the number of ringtones, as base elements of a CRBT system, is increasing. But the number of intelligent peripherals (IP) is also increasing. In the busy CRBT system, the low success rate of uploading ringtone of ringtone uploading terminals (terminal users, Service Providers (SPs), etc.) is more and more prominent.

SUMMARY

In view of this, the aim of the present invention is to provide a method and system of ringtone uploading service to improve the success rate of uploading ringtone.

The aim of the present invention is achieved via the following technical solution:

A method of a ringtone uploading service includes the following steps:

step A: a ringtone system receives a ringtone uploaded by a ringtone uploading terminal and uploads the uploaded ringtone to all ringtone servers; and step B: the ringtone system sends a response message about the successful or failed uploading to the ringtone uploading terminal according to a result of uploading the ringtone to the ringtone servers;

Wherein step B further includes the following steps:

step B1: the ringtone system sends a message about the successful uploading to the ringtone uploading terminal according to the result of successful uploading the ringtone to all ringtone servers; or step B2: the ringtone system sends a message about the failed uploading to the ringtone uploading terminal according to the result of failed uploading the ringtone to all ringtone servers; or step B3: according to the result of successfully uploading the ringtone to at least one but not all ringtone servers, the ringtone system records the ringtone uploading information, sends a message about the successful uploading the ringtone to the ringtone uploading terminal, and re-uploads the ringtone to the ringtone servers to which the ringtone has not been successfully uploaded.

The step for recording the ringtone uploading information in step B3 may include: an interface message processor of the ringtone system inserts a re-uploading ringtone information record into a ringtone database.

The step that the ringtone system re-uploads the ringtone to the ringtone servers to which the ringtone has not been successfully uploaded in step B3 may include:

step B31: the interface message processor of the ringtone system reads the re-uploading ringtone information record in the ringtone database table;

step B32: the interface message processor of the ringtone system acquires the physical ringtone from the ringtone servers to which the ringtone has been successfully uploaded according to the re-uploading ringtone information record; and step B33: after successfully acquiring the physical ringtone, the interface message processor of the ringtone system uploads the acquired physical ringtone to the ringtone servers to which the ringtone has not been successfully uploaded.

Step B33 may further include: when the acquisition of the physical ringtone is failed and the reason for such failure is that the physical ringtone does not exist, the interface message processor of the ringtone system prompts the ringtone uploading terminal to implement ringtone re-uploading manually.

In step A, the ringtone system may receive the uploaded ringtone by way of FTP downloading via the interface message processor.

The present invention also provides a ringtone system which includes an interface module, the interface module is used for receiving a ringtone uploaded by a ringtone uploading terminal, uploading the ringtone to ringtone servers, and sending a response message about the successful or failed uploading of the ringtone to the ringtone uploading terminal according to a result of uploading the ringtone to the ringtone servers;

In the ringtone system, the interface module further includes a re-uploading module, and the re-uploading module is used for recording ringtone uploading information when the ringtone system has successfully uploaded the ringtone to at least one but not all ringtone servers, sending a response message about the successful uploading of the ringtone to the ringtone uploading terminal, and re-uploading the ringtone to the ringtone servers to which the ringtone has not been successfully uploaded.

The re-uploading module may further include: an uploading information storage module, which is used for writing the ringtone uploading information record into a database when the ringtone system has successfully uploaded the ringtone to at least one but not all ringtone servers; and an uploading information reading module, which is used for reading the ringtone uploading information from the database before the ringtone system re-uploads the ringtone to the ringtone servers to which the ringtone has not been successfully uploaded.

The re-uploading module may further include a physical ringtone reading module, and the physical ringtone reading module is used for reading the physical ringtone from the ringtone servers to which the ringtone has been successfully uploaded.

The re-uploading module may further include a prompt module, and the prompt module is used for prompting the ringtone uploading terminal to implement ringtone manual re-uploading when the physical ringtone reading module has failed in reading the physical ringtone and the reason for such failure is that the physical ringtone does not exist.

The present invention also provides a system of a ringtone uploading service, which includes a ringtone uploading terminal and ringtone servers, wherein the ringtone uploading terminal is used for uploading a ringtone to the ringtone system;

the ringtone servers are used for storing the physical ringtone; and the ringtone system.

The ringtone uploading service system may further include a ringtone uploading portal, and the ringtone uploading portal is used for providing a portal interface between the ringtone uploading terminal and the ringtone system, and the ringtone uploading portal is a WEB site, an IVR, an SMS or a file server.

Compared with the existing technologies, the present invention has the following advantageous effects: when the ringtone system has successfully uploaded the ringtone to at least one but not all ringtone servers, it sends the message about the successful uploading to the uploading terminal and implements subsequent re-uploading, in this way, the success rate of uploading the ringtone will be greatly improved; in the process of re-uploading, the user is prompted to implement manual re-uploading if it is found that the physical ringtone does not exist, so as to improve the robustness of the system.

DETAILED DESCRIPTION

The present invention will be described in details hereinafter with reference to the specific embodiments and the drawings.

Figure 1:
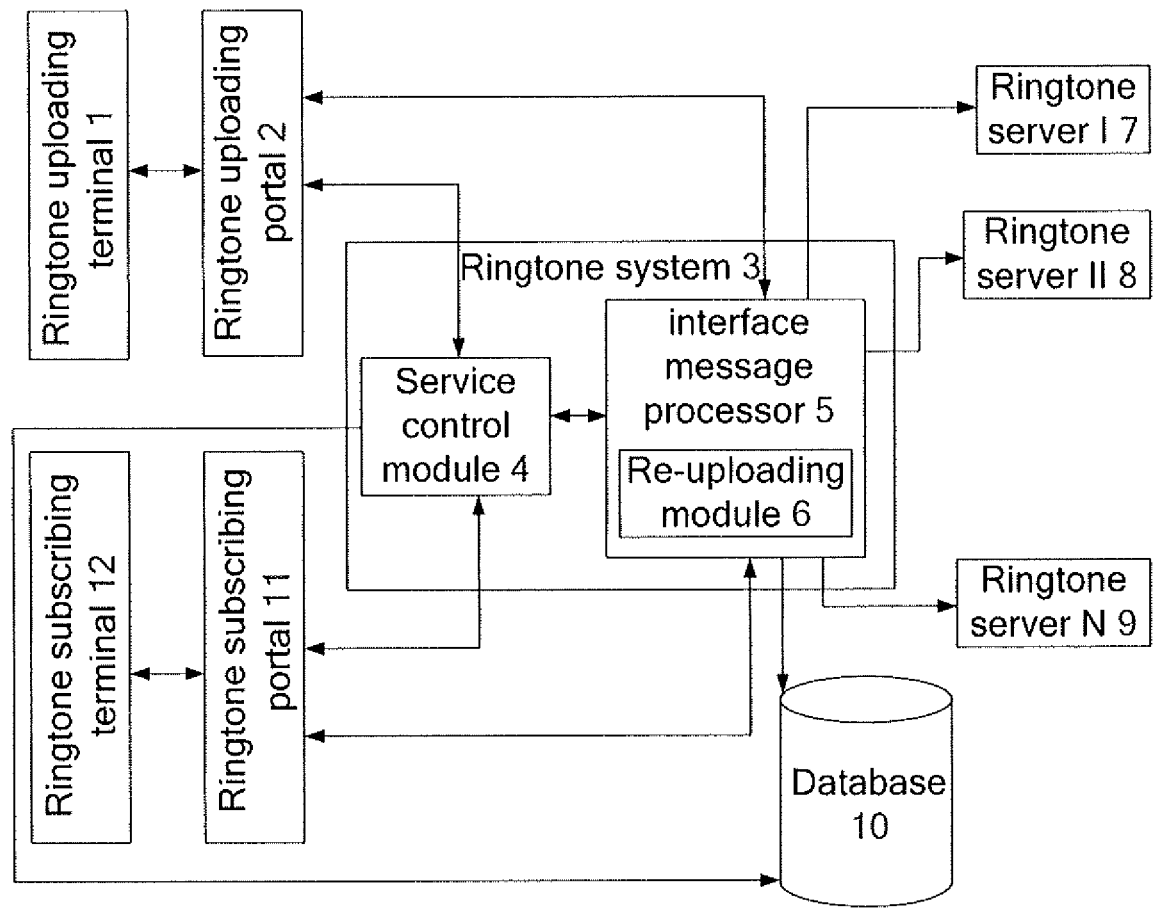
FIG. 1 is a diagram illustrating a structure of a system of ringtone uploading service according to embodiments of the present invention.

As shown in FIG. 1, an embodiment of a system of ringtone uploading service in the present invention includes a ringtone uploading terminal 1, a ringtone uploading portal 2, a ringtone server 7 and a ringtone system 3. The ringtone uploading terminal 1 is used for sending a ringtone uploading request and uploading a ringtone to the ringtone system 3; the ringtone server 7 is used for storing the physical ringtone, and there are several ringtone servers 7, 8, 9, the number of the ringtone servers is N in this embodiment, wherein N≥2; the ringtone uploading portal 2 is used for providing a portal interface between the ringtone uploading terminal 1 and the ringtone system 3. In this embodiment, the ringtone uploading portal 2 may be a WEB site, IVR, an SMS or a file server.

The ringtone system 3 includes an interface module 5, a service control module 4 and a database 10. The interface module 5 is used for responding and dealing with the ringtone uploading request, receiving the ringtone uploaded by the ringtone uploading terminal 1, uploading the ringtone to the ringtone servers, and sending a response message about the successful or failed uploading to the ringtone uploading terminal 1 according to a result uploaded by the ringtone server. The interface module 5 in this embodiment is an interface message processor, and the interface module 5 receives the ringtone uploaded by the ringtone uploading terminal 1 by way of FTP downloading. The interface module 5 further includes a re-uploading module 6, which is used for recording ringtone uploading information when the ringtone is successfully uploaded to at least one but not all ringtone servers, sending the response message about the successful uploading of the ringtone to the ringtone uploading terminal 1, and re-uploading the ringtone to the ringtone servers to which the ringtone has not been successfully uploaded. The re-uploading module 6 includes an uploading information storage module, an uploading information reading module, a timer, a physical ringtone reading module, a prompt module and a subscription prohibiting module. The uploading information storage module is used for writing an uploading information record of the ringtone into the ringtone database when the ringtone is successfully uploaded to at least one but not all ringtone servers; the uploading information reading module is used for reading the ringtone uploading information from the ringtone database before the ringtone is re-uploaded to the ringtone servers to which the ringtone has not been successfully uploaded; the timer is used for controlling the uploading information reading module to read the ringtone uploading information from the ringtone database regularly; the physical ringtone reading module is used for reading the physical ringtone from ringtone servers to which the ringtone has been successfully uploaded; the prompt module is used for prompting the user to implement manual re-uploading when the physical ringtone reading module has failed in reading the physical ringtone and the reason for such failure is that the physical ringtone does not exist; and the subscription prohibiting module is used for prohibiting the ringtone from being subscribed and shown when the ringtone is being re-uploaded. The service control module 4 is used for dealing with ringtone service logic. The database is used for storing ringtone's user data, ringtone data and other relevant data.

When the ringtone has been successfully uploaded to all ringtone servers, a ringtone subscribing terminal 12 may implement ringtone subscribing via a ringtone subscribing portal 11.

Figure 2:
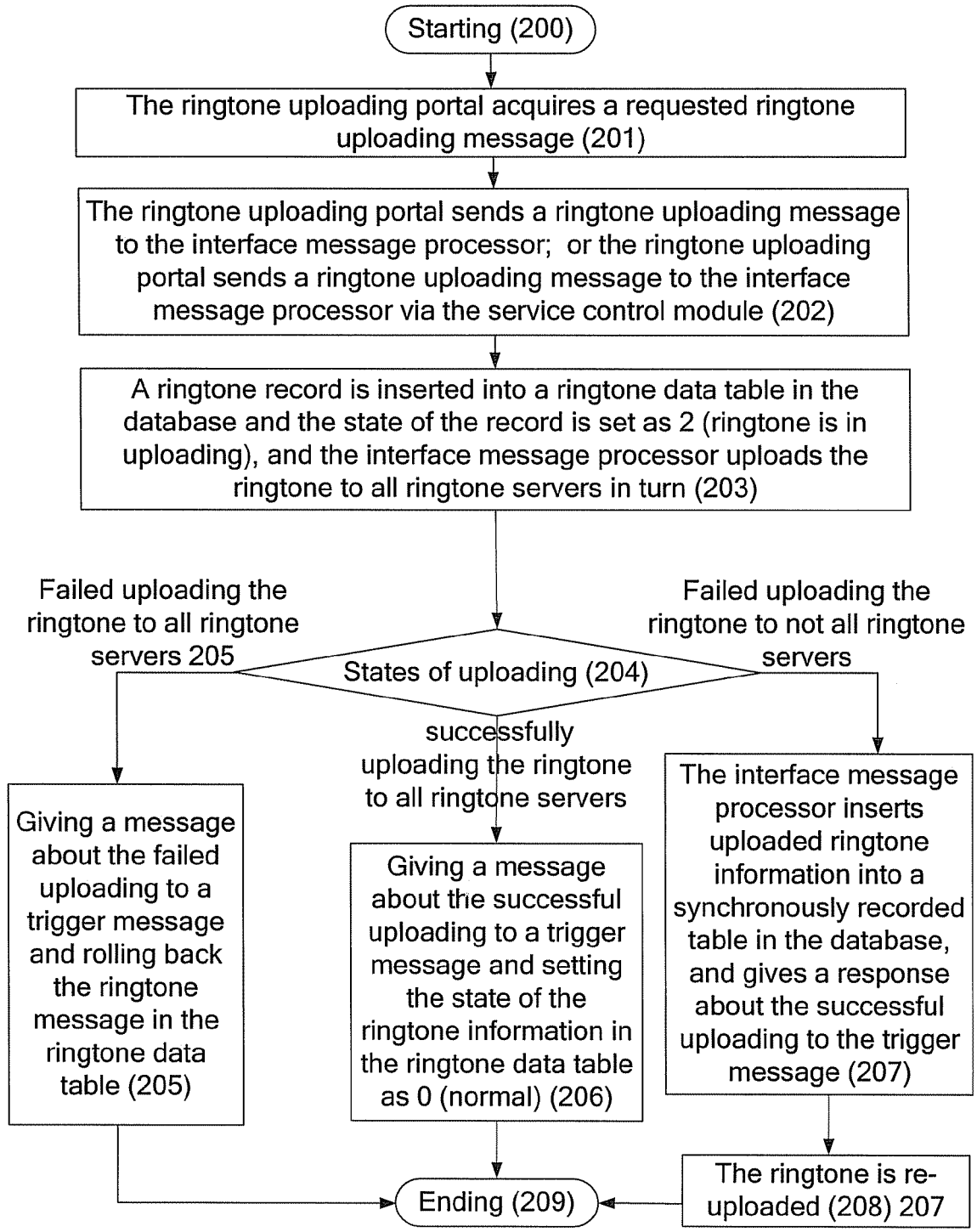
FIG. 2 is a flowchart illustrating a method of ringtone uploading service according to embodiments of the present invention.

As shown in FIG. 2, an embodiment of the ringtone uploading service method of the present invention includes the following steps:

step 200: the ringtone uploading terminal initiates a ringtone uploading message;

step 201: the ringtone uploading portal acquires the ringtone uploading message initiated by the ringtone uploading terminal;

step 202: the ringtone uploading portal sends a ringtone uploading request message to the interface message processor (in the form of WEB, etc.), or the ringtone uploading portal sends a ringtone uploading message to the interface message processor (in the form of IVR, etc.) via the service control module;

step 203: the interface message processor downloads the ringtone by way of FTP, if the uploading is successful, a ringtone record, whose state is set as "2" (ringtone in uploading), is inserted into a ringtone data table in the database, and then the interface message processor uploads the ringtone to all ringtone servers in turn;

step 204: the interface message processor determines the result of uploading the ringtone to all ringtone servers;

step 205: the interface message processor fails in uploading the physical ringtone to all ringtone servers, gives a response about the failed uploading to a trigger message, and rolls back the ringtone in the ringtone data table, then step 209 is executed;

step 206: the interface message processor succeeds in uploading the physical ringtone to all ringtone servers, gives a response about the successful uploading to the trigger message, and sets the state of the ringtone information in the ringtone data table as "0" (normal), then step 209 is executed;

step 207: if a physical ringtone has been successfully uploaded to at least one but not all ringtone servers, the interface message processor inserts uploaded ringtone information into a synchronously recorded table in the database and gives a response about the successful uploading to the trigger message;

step 208: the ringtone is re-uploaded; and step 209: ending.

Figure 3:
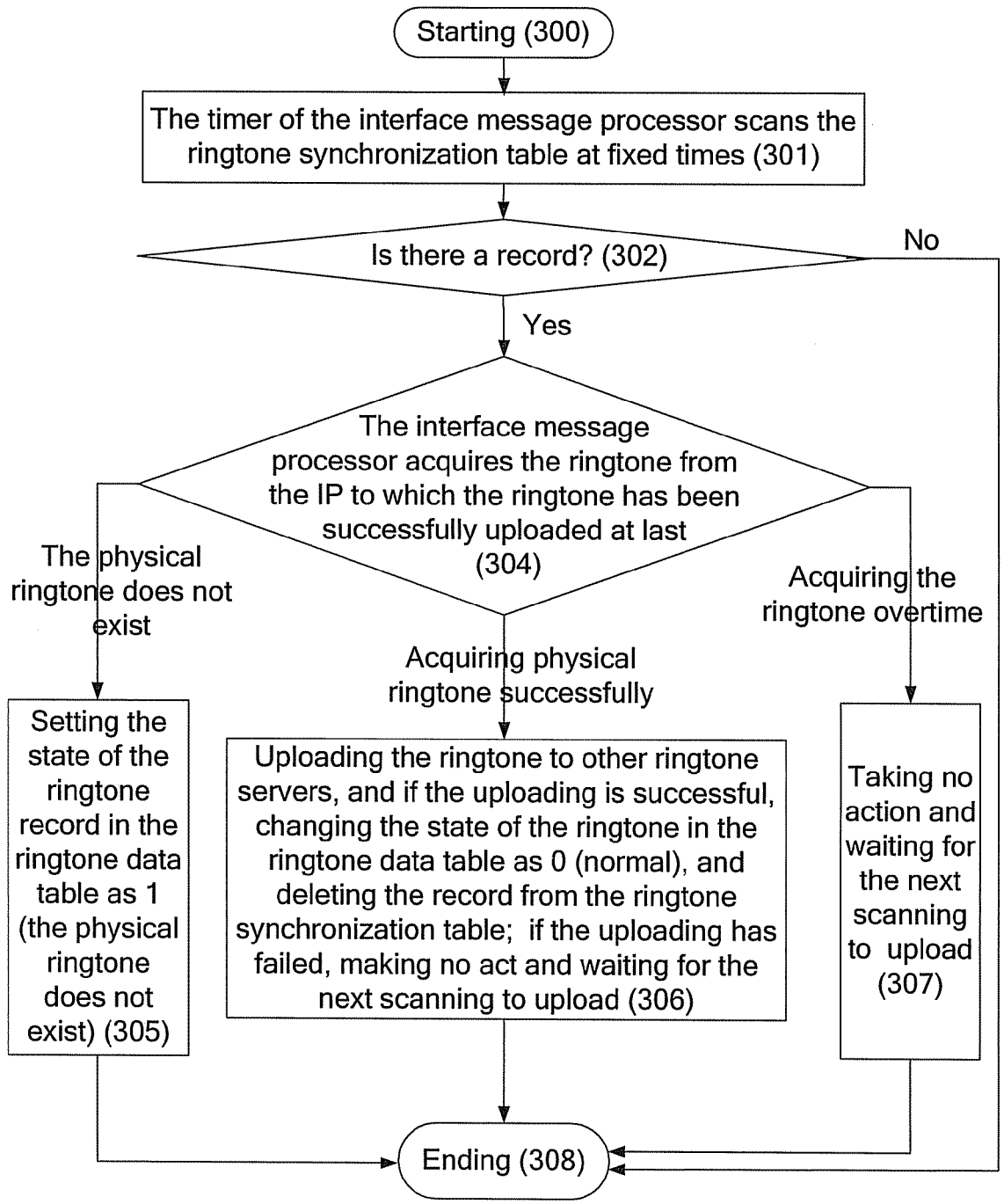
FIG. 3 is a flowchart illustrating the re-uploading of ringtones according to embodiments of the present invention.

In step 208, for the data inserted into the synchronization table in the database, the interface message processor scans the synchronization table at fixed times for ringtone re-uploading. The specific embodiment of one such scanning process is shown in FIG. 3, and it includes the following steps:

step 300: starting;

step 301: the interface message processor scans the ringtone synchronization table at fixed times;

step 302: it determines whether there is any record in the synchronization table;

step 303: if there is no record in the synchronization table, then step 308 is executed, to end of scanning, waiting for the next scanning;

step 304: the interface message processor acquires the ringtone record from the synchronization table and then, according to the ring tone information taken, acquires the physical ringtone from the ringtone servers to which the ringtone has been successfully uploaded at last;

step 305: the interface message processor determines that the physical ringtone does not exist and set the state of the ringtone in the ringtone table as "1" (physical ringtone does not exist), then step 308 is executed;

step 306: after having successfully acquired the physical ringtone, the interface message processor uploads the ringtone to the ringtone servers to which the ringtone has not been successfully uploaded; after the ringtone has been successfully uploaded to all ringtone servers, it sets the state of the ringtone record in the ringtone data table as "0" (normal) and deletes the corresponding record in the ringtone synchronization table; if the uploading has failed, no action will be taken, to wait for the next scanning by the interface message processor;

step 307: if the interface message processor acquires the physical ringtone overtime, no action will be taken, step 308 is executed, waiting for the next scanning; and step 308: end of scanning.

In step 305, if the state of the record in the ringtone table is "1" (physical ringtone does not exist), then it prompts the user to manually maintain via the WEB interface to acquire the corresponding physical ringtone to continue sending the uploading information.

Figure 4:
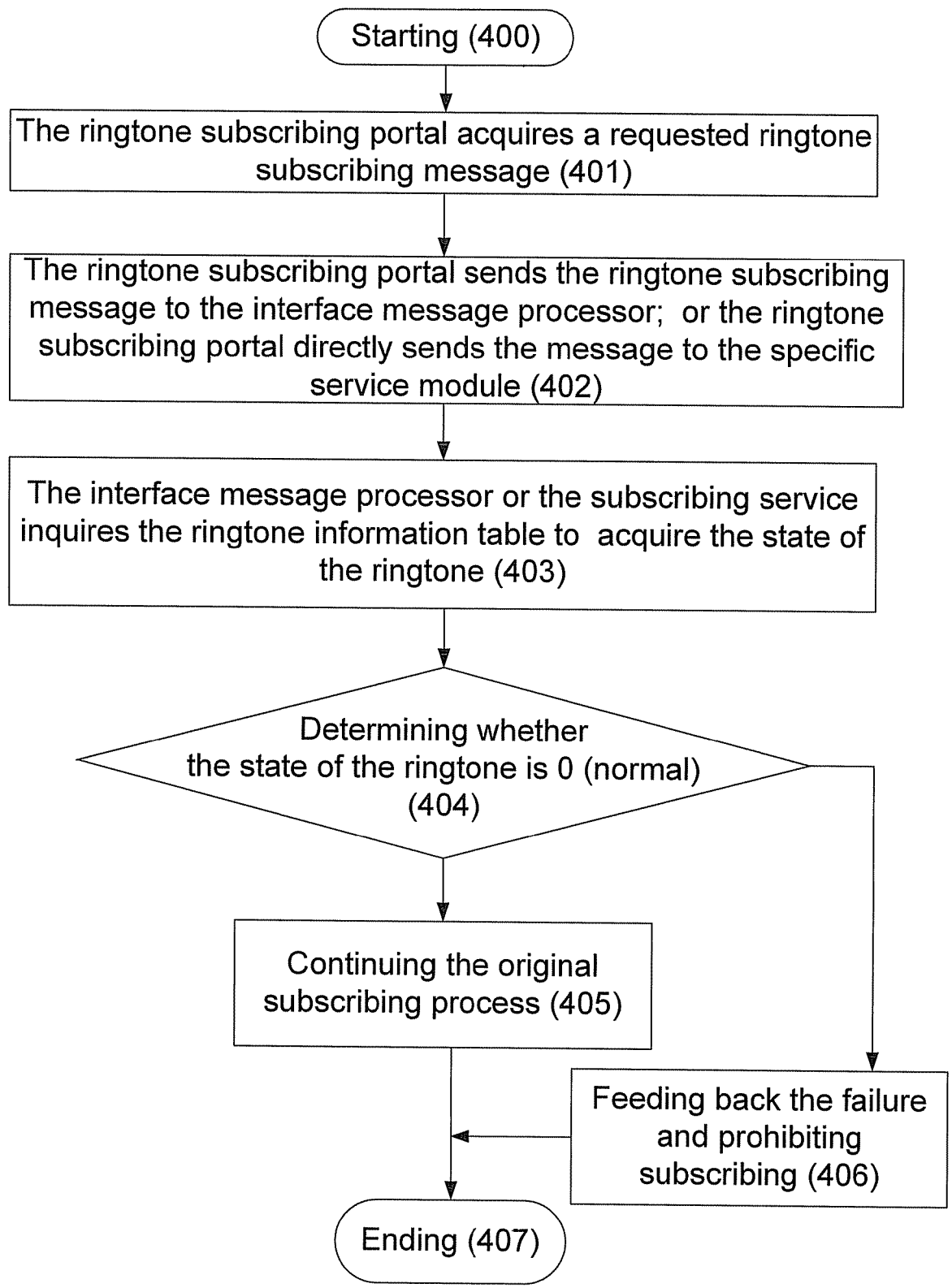
FIG. 4 is a flowchart illustrating the subscribing of ringtones according to embodiments of the present invention.

When the ringtone is in the state of re-uploading, the ringtone is prohibited from being subscribed and shown, as shown in FIG. 4. The steps in the ringtone subscribing process are as follows:

step 400: the ringtone subscribing terminal initiates a subscribing message;

step 401: the ringtone subscribing portal acquires the ringtone subscribing message initiated by the subscribing terminal;

step 402: the ringtone subscribing portal sends the ringtone subscribing message to the interface message processor (in the form of WEB or SMS), or the ringtone subscribing portal directly sends the message to the service module (in the form of IVR, etc.);

step 403: the interface message processor or the subscribing service inquires the ringtone information table and acquires the state of the ringtone;

step 404: the interface message processor or the subscribing service determines whether the state of the ringtone is "0" (normal);

step 405: if the state of the ringtone is "0" (normal), the subscribing process is continued, and step 407 is executed;

step 406: if the state of the ringtone is not "0", a response about failed subscribing is given to the trigger message, and the ringtone is prohibited from being subscribed; and step 407: ending.

The present invention is intended to improve the uploading of the ringtone in the ringtone system and to improve the success rate of uploading ringtone in main transportation networks (PSTN, GSN, CDMA and PHS networks, etc.). It is not only applied in the existing main transportation networks, but also suitable for next-generation network (NGN) exchange networks based on the IP network and IP multimedia subsystem (IMS) networks.

What stated as above is a description of the present invention in further detail made in combination with the specific exemplary embodiment and this description is not intended to limit the present invention. For those technicians skilled in the art of the present invention, the present invention may have many simple modifications and replacements. All such modifications and replacements made without departing from the concept of the present invention shall be within the protection scope of the present invention.

Industrial Applicability

Compared with the existing technology, the present invention has the following good effects: when a ringtone system has successfully uploaded a ringtone to at least one but not all ringtone servers, the uploading terminal is notified of the successful uploading, and then the subsequent re-uploading is implemented by the ringtone system, in this way, the success rate of ringtone uploading will be greatly improved; in the process of re-uploading, the user is prompted to implement manual re-uploading if it is found that the physical ringtone does not exist, so as to improve the robustness of the system.

What is claimed is:

1. A ringtone system, including:
    an interface message processor, which is set to receive a ringtone uploaded by a ringtone uploading terminal, to upload the ringtone to ringtone servers, and to send a response message about the successful or failed uploading of the ringtone to the ringtone uploading terminal according to a result of uploading the ringtone to the ringtone servers;
    wherein the interface message processor includes a re-uploading module, which is set to record ringtone uploading information when the ringtone system has successfully uploaded the ringtone to at least one but not all ringtone servers, and to send a response message about the successful uploading of the ringtone to the ringtone uploading terminal, and to re-upload the ringtone to the ringtone servers to which the ringtone has not been successfully uploaded.

2. The ringtone system of claim 1, wherein the re-uploading module includes:
    an uploading information storage module, which is set to write the ringtone uploading information record into a database when the ringtone system has successfully uploaded the ringtone to at least one but not all ringtone servers; and
    an uploading information reading module, which is set to read the ringtone uploading information from the database before the ringtone system re-uploads the ringtone to the ringtone servers to which the ringtone has not been successfully uploaded.

3. The ringtone system of claim 2, wherein the re-uploading module further includes a physical ringtone reading module, which is set to read a physical ringtone from the ringtone servers to which the ringtone has been successfully uploaded.

4. The ringtone system of claim 3, wherein the re-uploading module further includes a prompt module, which is set to prompt the ringtone uploading terminal to implement ringtone re-uploading manually when the physical ringtone reading module has failed in reading the physical ringtone and the reason for such failure is that the physical ringtone does not exist.

5. A system of ringtone uploading service, including:
a ringtone uploading terminal, which is set to upload a ringtone;
ringtone servers, which are set to store physical ringtones; and
the ringtone system including an interface module, which is set to receive a ringtone uploaded by a ringtone uploading terminal, to upload the ringtone to ringtone servers, and to send a response message about the successful or failed uploading of the ringtone to the ringtone uploading terminal according to a result of uploading the ringtone to the ringtone servers;
wherein the interface module includes a re-uploading module, which is set to record ringtone uploading information when the ringtone system has successfully uploaded the ringtone to at least one but not all ringtone servers, and to send a response message about the successful uploading of the ringtone to the ringtone uploading terminal, and to re-upload the ringtone to the ringtone servers to which the ringtone has not been successfully uploaded.

6. The ringtone uploading service system of claim 5, wherein further including a ringtone uploading portal, which is set to provide a portal interface between the ringtone uploading terminal and the ringtone system, and the ringtone uploading portal is a WEB site, an IVR, an SMS or a file server.

7. The ringtone uploading service system of claim 5, wherein the re-uploading module includes:
an uploading information storage module, which is set to write the ringtone uploading information record into a database when the ringtone system has successfully uploaded the ringtone to at least one but not all ringtone servers; and
an uploading information reading module, which is set to read the ringtone uploading information from the database before the ringtone system re-uploads the ringtone to the ringtone servers to which the ringtone has not been successfully uploaded.

8. The ringtone uploading service system of claim 7, wherein the re-uploading module further includes a physical ringtone reading module, which is set to read a physical ringtone from the ringtone servers to which the ringtone has been successfully uploaded.

9. The ringtone uploading service system of claim 8, wherein the re-uploading module further includes a prompt module, which is set to prompt the ringtone uploading terminal to implement ringtone re-uploading manually when the physical ringtone reading module has failed in reading the physical ringtone and the reason for such failure is that the physical ringtone does not exist.

10. The ringtone uploading service system of claim 7, wherein further comprising a ringtone uploading portal, which is set to provide a portal interface between the ringtone uploading terminal and the ringtone system, and the ringtone uploading portal is a WEB site, an IVR, an SMS or a file server.

11. The ringtone uploading service system of claim 8, wherein further comprising a ringtone uploading portal, which is set to provide a portal interface between the ringtone uploading terminal and the ringtone system, and the ringtone uploading portal is a WEB site, an IVR, an SMS or a file server.

12. The ringtone uploading service system of claim 9, wherein further comprising a ringtone uploading portal, which is set to provide a portal interface between the ringtone uploading terminal and the ringtone system, and the ringtone uploading portal is a WEB site, an IVR, an SMS or a file server.

* * * * *